(12) United States Patent
Kanai

(10) Patent No.: US 9,780,852 B2
(45) Date of Patent: Oct. 3, 2017

(54) TRANSMISSION CONTROL APPARATUS AND PROGRAM

(71) Applicant: SoftBank Corp., Tokyo (JP)

(72) Inventor: Takeo Kanai, Mission Viejo, CA (US)

(73) Assignee: SoftBank Corp., Tokyo (JP)

(*) Notice: Subject to any disclaimer, the term of this patent is extended or adjusted under 35 U.S.C. 154(b) by 68 days.

(21) Appl. No.: 14/879,104

(22) Filed: Oct. 9, 2015

(65) Prior Publication Data
US 2016/0036506 A1 Feb. 4, 2016

Related U.S. Application Data

(63) Continuation of application No. PCT/JP2014/003539, filed on Jul. 2, 2014.

(51) Int. Cl.
H04B 7/04 (2017.01)
H04B 7/10 (2017.01)
H04B 7/06 (2006.01)
H01Q 3/30 (2006.01)
H01Q 21/24 (2006.01)

(52) U.S. Cl.
CPC .......... *H04B 7/0469* (2013.01); *H04B 7/063* (2013.01); *H04B 7/0617* (2013.01); *H04B 7/0634* (2013.01); *H04B 7/10* (2013.01); *H01Q 3/30* (2013.01); *H01Q 21/24* (2013.01)

(58) Field of Classification Search
None
See application file for complete search history.

(56) References Cited

U.S. PATENT DOCUMENTS 7,715,495 B2 * 5/2010 Ahn ..................... H04B 7/0669
375/299
2007/0135161 A1 6/2007 Molnar et al.
2008/0232502 A1 9/2008 Wild et al.
(Continued)

FOREIGN PATENT DOCUMENTS

JP 2003-142940 A 5/2003
JP 2006-101080 A 4/2006

OTHER PUBLICATIONS

International Search Report for International Application No. PCT/JP2014/003539, issued by the Japan Patent Office on Sep. 22, 2014.
(Continued)

*Primary Examiner* — Hassan Phillips
*Assistant Examiner* — Gautam Sharma

(57) ABSTRACT

Provided is a transmission control apparatus that determine a first phase difference for a phase difference between an electric wave output by a first antenna and an electric wave output by a second antenna, and for a phase difference between an electric wave output by a third antenna and an electric wave output by a fourth antenna, based on a determined polarization characteristic; determines a second phase difference for a phase difference between the electric wave output by the first antenna and the electric wave output by the third antenna and for a phase difference between the electric wave output by the second antenna and the electric wave output by the fourth antenna, based on the determined beam direction; and controls phases of the electric waves output by the first to fourth antennas, according to the first and second phase differences.

14 Claims, 12 Drawing Sheets

(56) References Cited

U.S. PATENT DOCUMENTS

| | | | | |
|---|---|---|---|---|
| 2009/0219960 A1* | 9/2009 | Uberna | ............... | G02B 27/1006 |
| | | | | 372/27 |
| 2010/0144289 A1* | 6/2010 | Haskell | .................. | H01Q 1/246 |
| | | | | 455/83 |
| 2010/0246494 A1* | 9/2010 | Sanayei | ................ | H04B 7/0417 |
| | | | | 370/328 |
| 2013/0039348 A1 | 2/2013 | Hu et al. | | |
| 2013/0044650 A1* | 2/2013 | Barker | ................. | H04B 7/0617 |
| | | | | 370/278 |
| 2013/0257655 A1* | 10/2013 | Hu | ....................... | H04B 7/0408 |
| | | | | 342/373 |

OTHER PUBLICATIONS

International Preliminary Report on Patentability for International Application No. PCT/JP2014/003539, issued by the International Bureau of WIPO on Jan. 12, 2017.

* cited by examiner

CODEBOOK 1

|     | FIRST ANTENNA | SECOND ANTENNA | THIRD ANTENNA | FOURTH ANTENNA |
|-----|---------------|----------------|---------------|----------------|
| L-0 | 1             | j              | -1            | -j             |
| L-1 | -j            | 1              | -j            | 1              |
| L-2 | -1            | j              | 1             | -j             |
| L-3 | j             | 1              | j             | 1              |

| 150 | FIRST ANTENNA | SECOND ANTENNA | THIRD ANTENNA | FOURTH ANTENNA |
|---|---|---|---|---|
| L-0 | 1 | 1 | $1+\delta$ | $1+\delta$ |
| L-1 | -1 | 1 | $-1+\delta$ | $1+\delta$ |

PHASE DIFFERENCE: $\delta$
EQUIVALENT DELAY DISTANCE: $\delta \lambda / 2\pi$ ⇨ $d \cdot \sin\theta_0 = \delta \lambda / 2\pi$
BEAM DIRECTION: $\theta_0$

| 150 | FIRST ANTENNA | SECOND ANTENNA | THIRD ANTENNA | FOURTH ANTENNA |
|---|---|---|---|---|
| L-0 | -1 | j | $-1+\delta$ | $j+\delta$ |
| L-1 | j | -1 | $j+\delta$ | $-1+\delta$ |

TRANSMISSION CONTROL APPARATUS AND PROGRAM

BACKGROUND

1. Technical Field

The present invention relates to a transmission control apparatus and a program.

2. Related Art

Dual Layer Beamforming (TM8: Transmission Mode 8) is known as one LTE (Long Term Evolution) transmission mode defined by 3GPP (3rd Generation Partnership Project), as shown in Patent Document 1, for example. The base station configuration for TM8 includes arranging a plurality of antennas to each have an orientation of ±45 degrees, in order for orthogonal electric waves to be output by the plurality of antennas.

PRIOR ART DOCUMENTS

Patent Document 1: Japanese Unexamined Patent Application Publication No. 2013-529008

More efficient beam forming technology using a plurality of antennas is desired.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
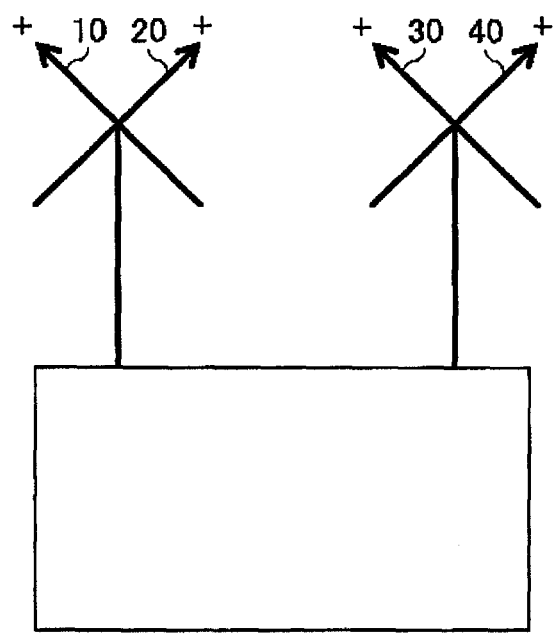
FIG. 1 is a schematic view of an exemplary function configuration of a transmission control apparatus.
Figure 1:
Figure 1:
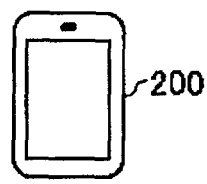
Figure 2:
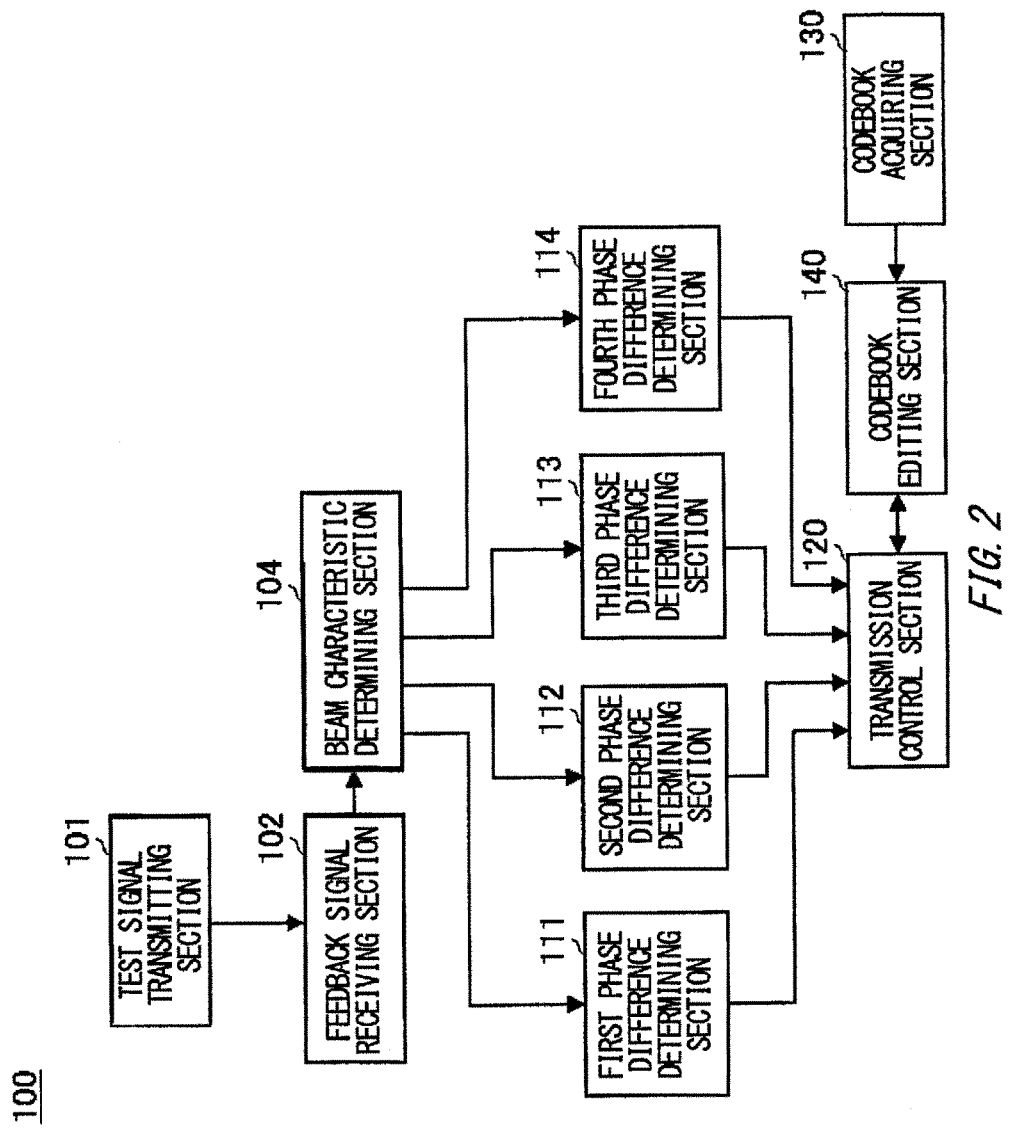
FIG. 2 is a schematic view of an exemplary function configuration of a transmission control apparatus.

FIG. 1 and FIG. 2 are each a schematic view of an exemplary function configuration of a transmission control apparatus 100. The transmission control apparatus 100 according to the present embodiment communicates wirelessly with a mobile terminal 200. The mobile terminal 200 may be any terminal that is capable of wireless communication, and may be a mobile telephone such as a smart phone, a tablet terminal, or a PC (Personal Computer), for example.

The transmission control apparatus 100 may communicate wirelessly with a plurality of the mobile terminals 200. The transmission control apparatus 100 may be a wireless communication base station. For example, the transmission control apparatus 100 may be an eNB (evolved Node B). The transmission control apparatus 100 may be a wireless LAN access point, for example.

The transmission control apparatus 100 includes a first antenna 10, a second antenna 20, a third antenna 30, and a fourth antenna 40. The first antenna 10, the second antenna 20, the third antenna 30, and the fourth antenna 40 may be linear antennas.

The first antenna 10 and the second antenna 20 are orthogonal to each other, and the path between the first antenna 10 and the mobile terminal 200 may be the same as the path between the second antenna 20 and the mobile terminal 200. The first antenna 10 and the second antenna 20 are a cross dipole antenna, for example. A cross dipole antenna is formed by two dipole antennas that are orthogonal to each other at their respective centers. The first antenna 10 and the second antenna 20 are arranged at angles of 45 degrees relative to the horizontal plane, for example.

The third antenna 30 may be arranged parallel to the first antenna 10. The third antenna 30 and the fourth antenna 40 are orthogonal to each other, and the path between the third antenna 30 and the mobile terminal 200 may be the same as the path between the fourth antenna 40 and the mobile terminal 200. The third antenna 30 and the fourth antenna 40 are a cross dipole antenna, for example. The third antenna 30 and the fourth antenna 40 are arranged at angles of 45 degrees relative to the horizontal plane, for example.

When electric waves having the same phase are output by the first antenna 10 and the second antenna 20, the polarization plane of the electric wave resulting from vector combination has vertical polarization. Furthermore, when electric waves having inverses phases from each other are output by the first antenna 10 and the second antenna 20, the polarization plane of the electric wave resulting from vector combination has horizontal polarization. When electric waves having a phase difference therebetween of 90 degrees are output by the first antenna 10 and the second antenna 20, the sum of the vectors rotates over time and has circular polarization. The third antenna 30 and the fourth antenna 40 operate in the same manner.

The transmission control apparatus 100 includes a test signal transmitting section 101, a feedback signal receiving section 102, a beam characteristic determining section 104, a first phase difference determining section 111, a second phase difference determining section 112, a third phase difference determining section 113, a fourth phase difference determining section 114, a transmission control section 120, a codebook acquiring section 130, and a codebook editing section 140. The transmission control apparatus 100 does not necessarily include all of these components.

The test signal transmitting section 101 transmits a test signal to the mobile terminal 200. The test signal transmitting section 101 transmits a sounding frame, which is a frame for estimating a wireless propagation path, to the mobile terminal 200, for example.

The feedback signal receiving section 102 receives a feedback signal from the mobile terminal 200. The feedback signal receiving section 102 receives, as the feedback signal, an SRS (Sounding Reference Signal), a PMI (Precoding Matrix Indicator), a CQI (Channel Quality Indicator), or an RI (Rank Indicator), for example. The feedback signal receiving section 102 may receive, from the mobile terminal 200, CSI (Channel State Information) feedback including a reception state of the mobile terminal 200 for the sounding frame transmitted by the test signal transmitting section 101.

The beam characteristic determining section 104 determines a beam characteristic based on the feedback signal received by the feedback signal receiving section 102.

For example, the beam characteristic determining section 104 determines the beam direction indicating the direction of the beam formed by the transmission control apparatus 100, as the beam characteristic. The beam characteristic determining section 104 may use any technique that enables the beam direction to be determined. For example, the beam characteristic determining section 104 may determine the beam direction from a phase difference of the feedback signal received by the feedback signal receiving section 102. As another example, the beam characteristic determining section 104 may calculate the CSI (Channel State Information) based on the SRS received by the feedback signal receiving section 102, and determine the beam direction based on the calculated CSI. As yet another example, the beam characteristic determining section 104 may determine the beam direction based on the CSI feedback received from the mobile terminal 200 by the feedback signal receiving section 102.

As another example, the beam characteristic determining section 104 may determine a polarization characteristic of the beam formed by the transmission control apparatus 100, as the beam characteristic. The polarization characteristic indicates whether the polarization plane has vertical polarization, horizontal polarization, circular polarization, or elliptical polarization, for example. The beam characteristic determining section 104 may use any technique that enables the polarization characteristic to be determined. For example, the beam characteristic determining section 104 may determine the polarization characteristic of a test signal having high reception sensitivity from among a plurality of test signals having different polarization characteristics transmitted to the mobile terminal 200 by the test signal transmitting section 101, based on the feedback signal from the mobile terminal 200. As another example, in a case where the feedback signal received by the feedback signal receiving section 102 includes data designating the polarization characteristic, the beam characteristic determining section 104 determines the polarization characteristic according to this data.

The first phase difference determining section 111 determines a first phase difference for a phase difference between the electric wave output by the first antenna 10 and the electric wave output by the second antenna 20 and a phase difference between the electric wave output by the third antenna 30 and the electric wave output by the fourth antenna 40, based on the polarization characteristic determined by the beam characteristic determining section 104. For example, the first phase difference determining section 111 determines the first phase difference such that the polarization plane formed by the electric wave output by the first antenna 10 and the electric wave output by the second antenna 20 has vertical polarization. As another example, the first phase difference determining section 111 determines the first phase difference such that the polarization plane formed by the electric wave output by the first antenna 10 and the electric wave output by the second antenna 20 has horizontal polarization. As yet another example, the first phase difference determining section 111 determines the first phase difference such that the polarization plane formed by the electric wave output by the first antenna 10 and the electric wave output by the second antenna 20 has circular polarization.

The second phase difference determining section 112 determines a second phase difference for a phase difference between the electric wave output by the first antenna 10 and the electric wave output by the third antenna 30 and a phase difference between the electric wave output by the second antenna 20 and the electric wave output by the fourth antenna 40, based on the beam direction determined by the beam characteristic determining section 104. The second phase difference determining section 112 may determine the second phase difference such that the directions of the beams formed by the electric waves output respectively by the first antenna 10, the second antenna 20, the third antenna 30, and the fourth antenna 40 match the beam direction determined by the beam characteristic determining section 104.

In a case where the transmission control apparatus 100 forms a plurality of layers for respectively transmitting a plurality of beams for which at least one of the beam directions and the polarization characteristics are different, the first phase difference determining section 111 may determine the first phase difference in a first layer among the plurality of layers and the second phase difference determining section 112 may determine the second phase difference in the first layer.

The third phase difference determining section 113 may determine a third phase difference, which forms a polarization plane orthogonal to the polarization plane formed by the first phase difference, for a phase difference between the electric wave output by the first antenna 10 and the electric wave output by the second antenna 20 and a phase difference between the electric wave output by the third antenna 30 and the electric wave output by the fourth antenna 40 in a second layer among the plurality of layers.

The fourth phase difference determining section 114 may determine a fourth phase difference that is the same as the second phase difference, for a phase difference between the electric wave output by the first antenna 10 and the electric wave output by the third antenna 30 and a phase difference between the electric wave output by the second antenna 20 and the electric wave output by the fourth antenna 40 in the second layer.

The transmission control section 120 may control the phases of the electric waves output respectively by the first antenna 10, the second antenna 20, the third antenna 30, and the fourth antenna 40 according to the first phase difference determined by the first phase difference determining section 111 and the second phase difference determined by the second phase difference determining section 112. The transmission control section 120 may generate a codebook based on the determined first phase difference and second phase difference, and control the phases of the electric waves output by the first antenna 10, the second antenna 20, the third antenna 30, and the fourth antenna 40 based on the generated codebook.

The transmission control section 120 may control the phases of the electric waves output respectively by the first antenna 10, the second antenna 20, the third antenna 30, and the fourth antenna 40 according to the first phase difference determined by the first phase difference determining section 111, the second phase difference determined by the second phase difference determining section 112, the third phase difference determined by the third phase difference determining section 113, and the fourth phase difference determined by the fourth phase difference determining section 114. The transmission control section 120 may generate a codebook based on the determined first phase difference, second phase difference, third phase difference, and fourth phase difference, and control the phases of the electric waves output by the first antenna 10, the second antenna 20, the third antenna 30, and the fourth antenna 40 based on the generated codebook.

The codebook acquiring section 130 acquires the codebook used for precoding in Transmission Mode 4, which is an LTE (Long Term Evolution) transmission mode defined by 3GPP (3rd Generation Partnership Project). The codebook acquiring section 130 may read the codebook that is stored in advance in a storage medium of the transmission control apparatus 100. The codebook acquiring section 130 may receive the codebook from another apparatus.

The codebook editing section 140 edits the codebook acquired by the codebook acquiring section 130, based on the first phase difference determined by the first phase difference determining section 111, the second phase difference determined by the second phase difference determining section 112, the third phase difference determined by the third phase difference determining section 113, and the fourth phase difference determined by the fourth phase difference determining section 114. The transmission control section 120 may control the phases of the electric waves output by the first antenna 10, the second antenna 20, the third antenna 30, and the fourth antenna 40 using the codebook that has been edited by the codebook editing section 140.

Figure 3:
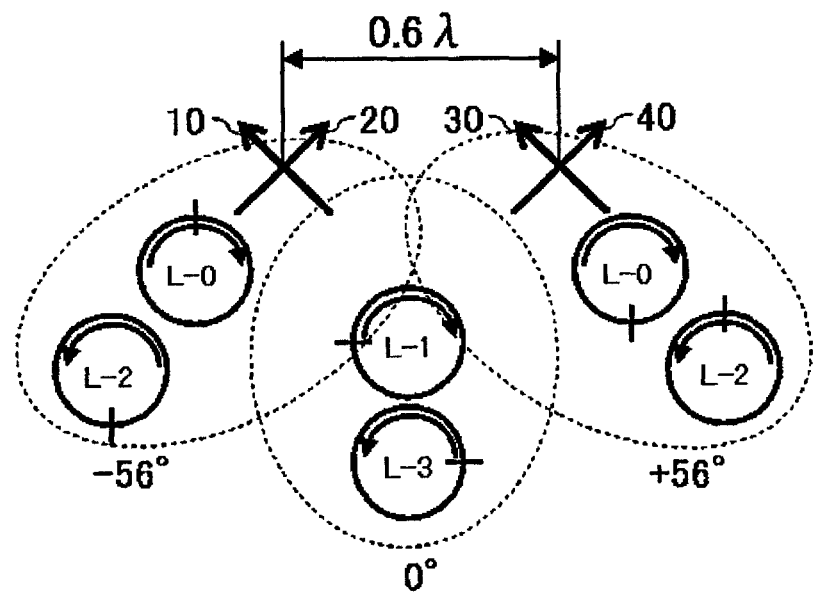
FIG. 3 is a schematic view of an exemplary codebook 1 acquired by the transmission control section and exemplary beams formed in a case where the codebook 1 is used without being edited.

FIG. 3 is a schematic view of an exemplary codebook 1 acquired by the codebook acquiring section 130 and exemplary beams formed in a case where the codebook 1 is used without being edited. FIG. 3 shows an example in which the beam is formed using the codebook 1 when the distance between the set of the first antenna 10 and the second antenna 20 and the set of the third antenna 30 and the fourth antenna 40 is 0.6λ.

According to the codebook 1, as shown in FIG. 3, a layer 1 (sometimes referred to as "L-1") and a layer 3 (sometimes referred to as "L-3") with circular polarization are formed in a direction of 0 degrees and a layer 0 (sometimes referred to as "L-0") and a layer 2 (sometimes referred to as "L-2") with circular polarization are formed in directions of ±56 degrees.

Figure 4:
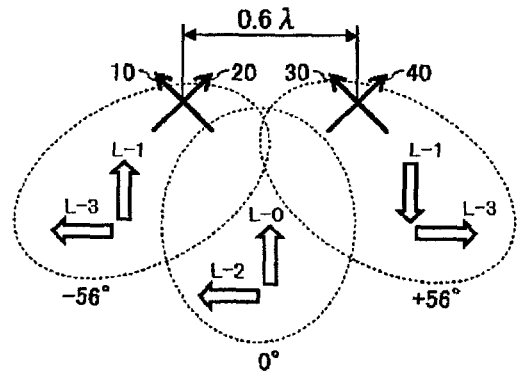
FIG. 4 is a schematic view of exemplary beams formed in a case where a codebook 0, a codebook 2, and a codebook 3 are used.
Figure 4:
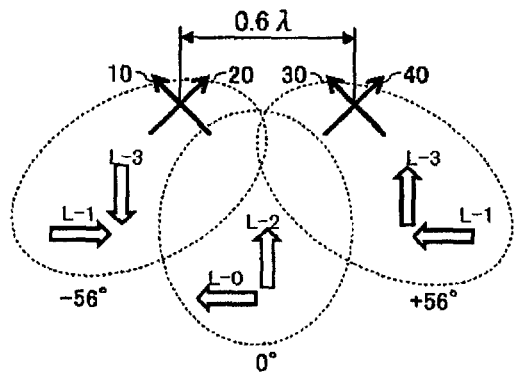
Figure 4:
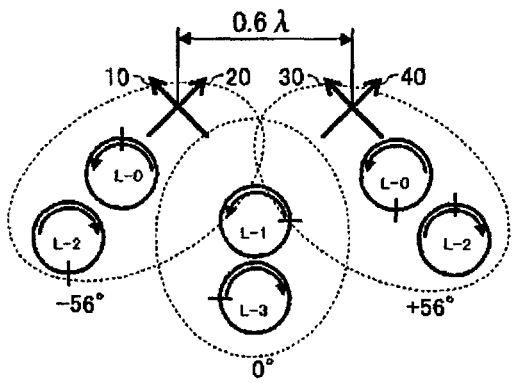

FIG. 4 is a schematic view of exemplary beams formed in a case where a codebook 0, a codebook 2, and a codebook 3 are used. With the codebook 0, as shown in FIG. 4, L-0 and L-2 with linear polarization are formed in the direction of 0 degrees, and L-1 and L-3 with linear polarization are formed in directions of ±56 degrees. Furthermore, with the codebook 2, as shown in FIG. 4, L-0 and L-2 with linear polarization are formed in the direction of 0 degrees, and L-1 and L-3 with linear polarization are formed in directions of ±56 degrees. Yet further, with the codebook 3, as shown in FIG. 4, L-1 and L-3 with circular polarization are formed in the direction of 0 degrees, and L-0 and L-2 with circular polarization are formed in directions of ±56 degrees.

Figure 5:
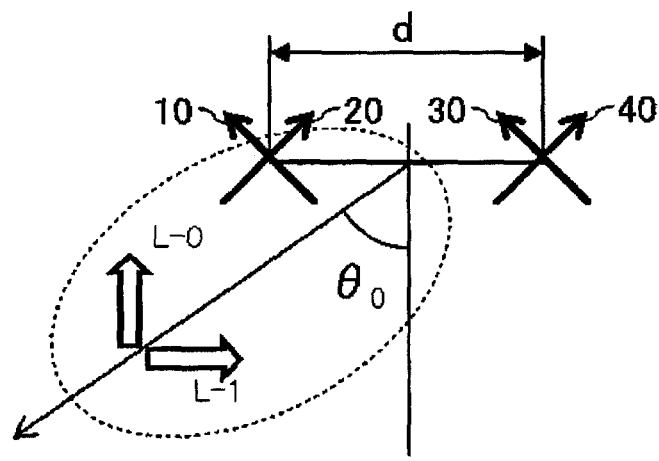
FIG. 5 is a schematic view of exemplary beams formed by the transmission control apparatus and an exemplary codebook used by the transmission control apparatus.

FIG. 5 is a schematic view of exemplary beams formed by the transmission control apparatus 100 and an exemplary codebook 150 used by the transmission control apparatus 100. FIG. 5 shows an example in which two layers are formed by four antennas. Here, an example is described in which the beam direction determined by the beam characteristic determining section 104 is $\theta_0$, the polarization plane of L-0 has vertical polarization, and the polarization plane of L-1 has horizontal polarization.

Since the polarization plane of L-0 has vertical polarization, the first phase difference determining section 111 determines the phase difference between the electric wave output by the first antenna 10 and the electric wave output by the second antenna 20 and the phase difference between the electric wave output by the third antenna 30 and the electric wave output by the fourth antenna 40 to each be 0.

The second phase difference determining section 112 determines the phase difference between the electric wave output by the first antenna 10 and the electric wave output by the third antenna 30 and the phase difference between the electric wave output by the second antenna 20 and the electric wave output by the fourth antenna 40 to each be δ, based on the beam direction $\theta_0$ determined by the beam characteristic determining section 104.

Since the polarization plane of L-1 has horizontal polarization, the third phase difference determining section 113 determines the phase difference between the electric wave output by the first antenna 10 and the electric wave output by the second antenna 20 and the phase difference between the electric wave output by the third antenna 30 and the electric wave output by the fourth antenna 40 to each be 180 degrees.

The fourth phase difference determining section 114 determines the phase difference between the electric wave output by the first antenna 10 and the electric wave output by the third antenna 30 and the phase difference between the electric wave output by the second antenna 20 and the electric wave output by the fourth antenna 40 to each be δ, based on the beam direction $\theta_0$ determined by the beam characteristic determining section 104.

The transmission control section 120 may generate the codebook 150 using the phase differences determined by the first phase difference determining section 111, the second phase difference determining section 112, the third phase difference determining section 113, and the fourth phase difference determining section 114. The transmission control section 120 may receive from the codebook editing section 140 the codebook that has been edited using the phase differences determined by the first phase difference determining section 111, the second phase difference determining section 112, the third phase difference determining section 113, and the fourth phase difference determining section 114. For example, the codebook editing section 140 edits the codebook received from the codebook acquiring section 130 using the phase differences determined by the first phase difference determining section 111, the second phase difference determining section 112, the third phase difference determining section 113, and the fourth phase difference determining section 114 received from the transmission control section 120, and transmits the edited codebook to the transmission control section 120.

Figure 6:
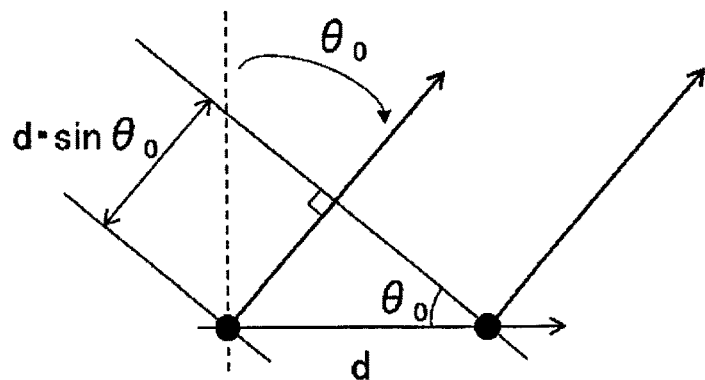
FIG. 6 is a view for describing the technique for calculating the phase difference δ determined by the second phase difference determining section and the fourth phase difference determining section.

FIG. 6 is a view for describing the technique for calculating the phase difference δ determined by the second phase difference determining section 112 and the fourth phase difference determining section 114. The equivalent delay distance for the phase difference δ is δλ/2 π, and therefore the relationship between $\theta_0$ and δ is as shown below in Expression 1.

$$d \cdot \sin \theta_0 = \delta \lambda / 2\pi \qquad \text{Expression 1:}$$

Accordingly, ι can be calculated using Expression 2 shown below.

$$\delta = 2\pi d \cdot \sin \theta_0 / \lambda \qquad \text{Expression 2:}$$

Figure 7:
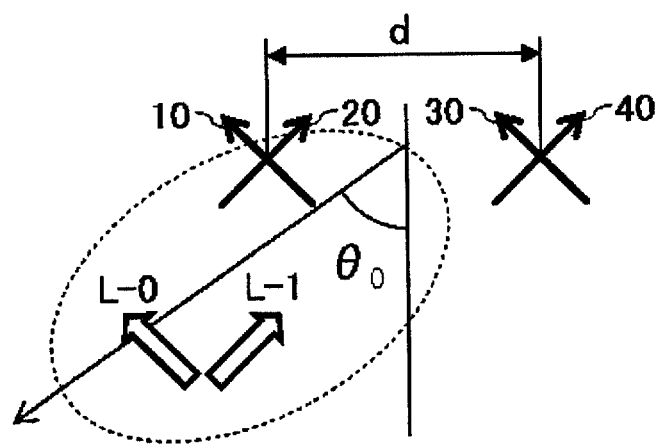
FIG. 7 is a schematic view of other exemplary beams formed by the transmission control apparatus 100 and another exemplary codebook used by the transmission control apparatus.

FIG. 7 is a schematic view of other exemplary beams formed by the transmission control apparatus 100 and another exemplary codebook 150 used by the transmission control apparatus 100. Here, an example is described in which the beam direction determined by the beam characteristic determining section 104 is $\theta_0$, the polarization plane of L-0 is parallel to the first antenna 10 and the third antenna 30, and the polarization plane of L-1 is parallel to the second antenna 20 and the fourth antenna 40.

The first phase difference determining section 111 determines the phase difference between the electric wave output by the first antenna 10 and the electric wave output by the second antenna 20 and the phase difference between the electric wave output by the third antenna 30 and the electric wave output by the fourth antenna 40 to each be 180 degrees.

The second phase difference determining section 112 determines the phase difference between the electric wave output by the first antenna 10 and the electric wave output by the third antenna 30 and the phase difference between the electric wave output by the second antenna 20 and the electric wave output by the fourth antenna 40 to each be δ, based on the beam direction $\theta_0$ determined by the beam characteristic determining section 104.

The third phase difference determining section 113 determines the phase difference between the electric wave output by the first antenna 10 and the electric wave output by the second antenna 20 and the phase difference between the electric wave output by the third antenna 30 and the electric wave output by the fourth antenna 40 to each be 180 degrees.

The fourth phase difference determining section 114 determines the phase difference between the electric wave output by the first antenna 10 and the electric wave output by the third antenna 30 and the phase difference between the electric wave output by the second antenna 20 and the electric wave output by the fourth antenna 40 to each be δ, based on the beam direction $\theta_0$ determined by the beam characteristic determining section 104.

The transmission control section 120 may generate the codebook 150 shown in FIG. 7 using the phase differences determined by the first phase difference determining section 111, the second phase difference determining section 112, the third phase difference determining section 113, and the fourth phase difference determining section 114.

Figure 8:
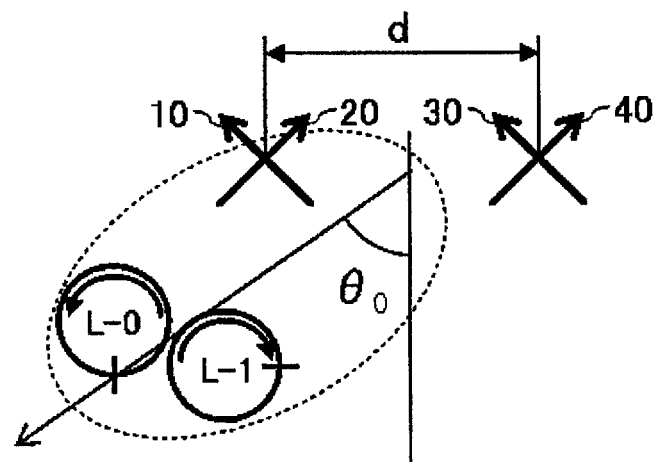
FIG. 8 is a schematic view of other exemplary beams formed by the transmission control apparatus 100 and another exemplary codebook used by the transmission control apparatus.

FIG. 8 is a schematic view of other exemplary beams formed by the transmission control apparatus and another exemplary codebook used by the transmission control apparatus. Here, an example is described in which the beam direction determined by the beam characteristic determining section 104 is $\theta_0$, the polarization plane of L-0 has left-handed circular polarization, and the polarization plane of L-1 has right-handed circular polarization.

The first phase difference determining section 111 determines the phase difference between the electric wave output by the first antenna 10 and the electric wave output by the second antenna 20 and the phase difference between the electric wave output by the third antenna 30 and the electric wave output by the fourth antenna 40 to each be 90 degrees. The first phase difference determining section 111 sets the phase of the first antenna 10 to be −1 and the phase of the second antenna 20 to be j, in order to realize the left-handed circular polarization.

The second phase difference determining section 112 determines the phase difference between the electric wave output by the first antenna 10 and the electric wave output by the third antenna 30 and the phase difference between the electric wave output by the second antenna 20 and the electric wave output by the fourth antenna 40 to each be δ, based on the beam direction $\theta_0$ determined by the beam characteristic determining section 104.

The third phase difference determining section 113 determines the phase difference between the electric wave output by the first antenna 10 and the electric wave output by the second antenna 20 and the phase difference between the electric wave output by the third antenna 30 and the electric wave output by the fourth antenna 40 to each be 90 degrees. The third phase difference determining section 113 sets the phase of the first antenna 10 to be j and the phase of the second antenna 20 to be −1, in order to realize the right-handed circular polarization.

The fourth phase difference determining section 114 determines the phase difference between the electric wave output by the first antenna 10 and the electric wave output by the third antenna 30 and the phase difference between the electric wave output by the second antenna 20 and the electric wave output by the fourth antenna 40 to each be δ, based on the beam direction $\theta_0$ determined by the beam characteristic determining section 104.

The transmission control section 120 may generate the codebook 150 shown in FIG. 8 using the phase differences determined by the first phase difference determining section 111, the second phase difference determining section 112, the third phase difference determining section 113, and the fourth phase difference determining section 114.

In this way, with the transmission control apparatus 100 according to the present embodiment, it is possible to form two arbitrary polarization planes that are oriented in arbitrary directions and orthogonal to each other, according to the phase differences determined by the first phase difference determining section 111, the second phase difference determining section 112, the third phase difference determining section 113, and the fourth phase difference determining section 114. In particular, with the transmission control apparatus 100 according to the present embodiment, it is possible to form two arbitrary linear polarizations that are orthogonal to each other and to form two arbitrary circular polarizations that are orthogonal to each other. The transmission control apparatus 100 may use TM8 as a standard, and with the transmission control apparatus 100 it is possible to switch the polarization characteristic of the transmitted electric waves between linear polarization and circular polarization, according to the communication environment, and to realize beam forming with four antennas and two layers that is capable of forming beams in arbitrary directions.

With a conventional base station in TM8, an arrangement is adopted in which a plurality of antennas are respectively oriented at ±45 degrees in order to realize linear polarizations that are orthogonal to each other. However, in a case where the direction of a terminal changes during communication, such as in the case of a mobile telephone, it is sometimes impossible to obtain sufficient reception sensitivity even when two linear polarizations that are orthogonal to each other are formed. In contrast to this, with the transmission control apparatus 100 according to the present embodiment, it is possible to form two arbitrary circular polarizations that are orthogonal to each other, and therefore no matter how the antenna of the terminal is arranged or how the terminal is oriented, it is possible to maintain the reception sensitivity at or above a prescribed level.

Figure 9:
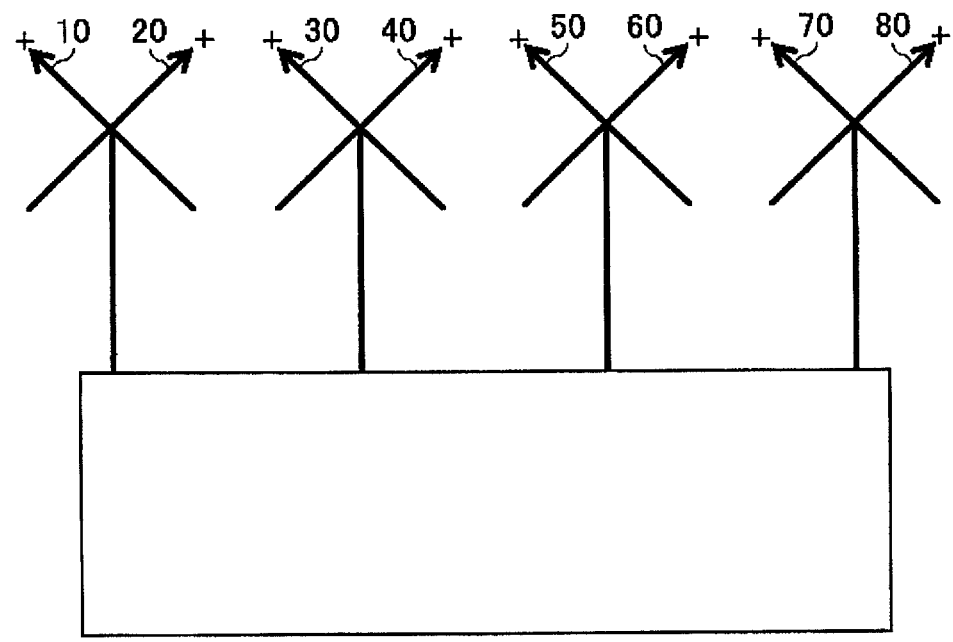
FIG. 9 is a schematic view of another exemplary function configuration of the transmission control apparatus.
Figure 9:
Figure 9:
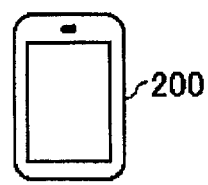
Figure 10:
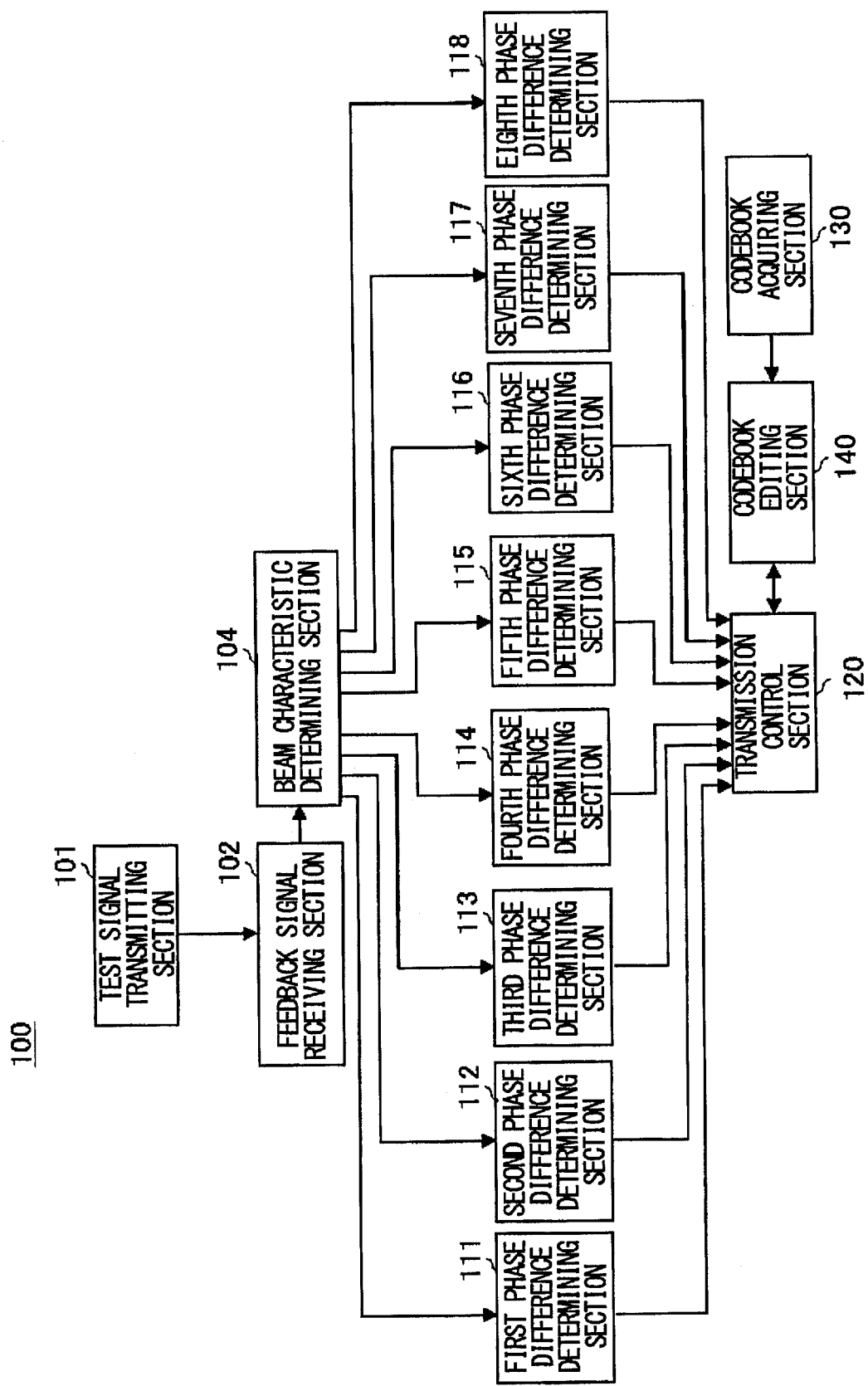
FIG. 10 is a schematic view of another exemplary function configuration of the transmission control apparatus.

FIGS. 9 and 10 are schematic views of other exemplary function configurations of the transmission control apparatus 100. The transmission control apparatus 100 shown in FIG. 9 differs from the transmission control apparatus 100 shown in FIGS. 1 and 2 by further including a fifth antenna 50, a sixth antenna 60, a seventh antenna 70, an eighth antenna 80, a fifth phase difference determining section 115, a sixth phase difference determining section 116, a seventh phase difference determining section 117, and an eighth phase difference determining section 118. The remaining functional configuration of this transmission control apparatus 100 may be the same as that of the transmission control apparatus 100 shown in FIGS. 1 and 2. The transmission control apparatus 100 shown in FIG. 9 may form two layers using eight antennas.

Figure 11:
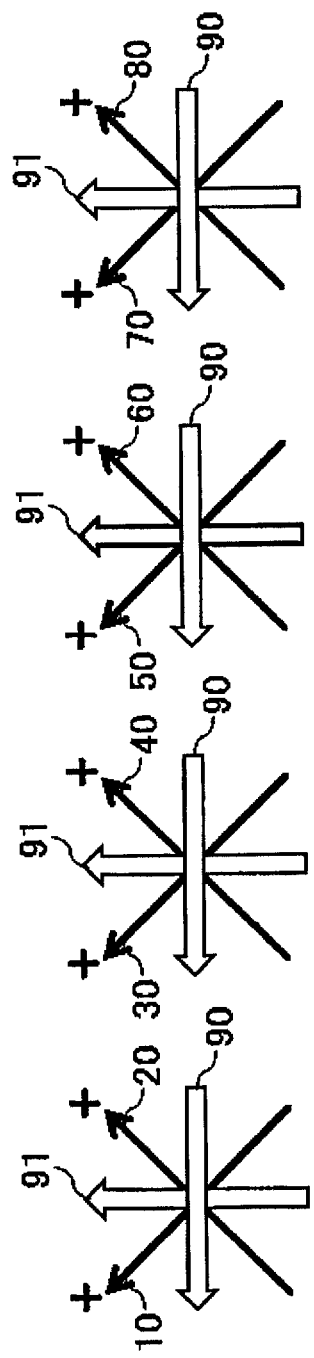
FIG. 11 is a schematic view of an exemplary beam formed by the transmission control apparatus.
Figure 12:
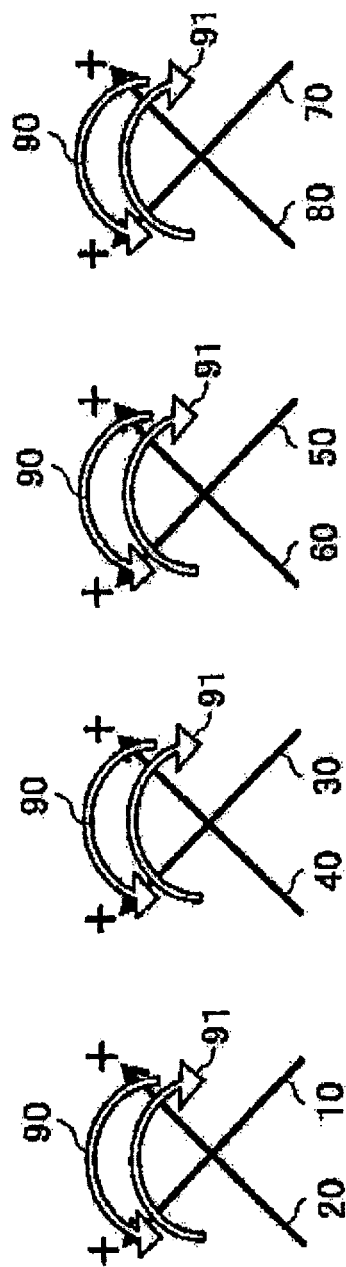
FIG. 12 is a schematic view of an exemplary beam formed by the transmission control apparatus.

FIGS. 11 and 12 are schematic views of beams formed by the transmission control apparatus 100 shown in FIGS. 9 and 10. FIG. 11 shows an example in which the polarization characteristic determined by the beam characteristic determining section 104 is linear polarization, and FIG. 12 shows an example in which the polarization characteristic determined by the beam characteristic determining section 104 is circular polarization.

In the example shown in FIG. 11, the transmission control apparatus 100 causes each set of the first antenna 10 and the second antenna 20, the third antenna 30 and the fourth antenna 40, the fifth antenna 50 and the sixth antenna 60, and the seventh antenna 70 and the eighth antenna 80 to form horizontal polarization as the polarization plane 90 of L-0, and causes each set of the first antenna 10 and the second antenna 20, the third antenna 30 and the fourth antenna 40, the fifth antenna 50 and the sixth antenna 60, and the seventh antenna 70 and the eighth antenna 80 to form vertical polarization as the polarization plane 91 of L-1.

In the example of FIG. 12, the transmission control apparatus 100 causes each set of the first antenna 10 and the second antenna 20, the third antenna 30 and the fourth antenna 40, the fifth antenna 50 and the sixth antenna 60, and the seventh antenna 70 and the eighth antenna 80 to form left-handed circular polarization as the polarization plane 90, and causes each set of the first antenna 10 and the second antenna 20, the third antenna 30 and the fourth antenna 40, the fifth antenna 50 and the sixth antenna 60, and the seventh antenna 70 and the eighth antenna 80 to form right-handed circular polarization as the polarization plane 91.

The transmission control apparatus 100 controls the phase differences among the phases of the electric waves formed by the first antenna 10 and the second antenna 20, the phases of the electric waves formed by the third antenna 30 and the fourth antenna 40, the phases of the electric waves formed by the fifth antenna 50 and the sixth antenna 60, and the phases of the electric waves formed by the seventh antenna 70 and the eighth antenna 80, based on the beam direction determined by the beam characteristic determining section 104.

In this way, the transmission control apparatus 100 according to the present embodiment can switch the polarization characteristic of the transmitted electric waves between linear polarization and circular polarization, according to the communication environment, and can realize beam forming using eight antennas and two layers that is capable of forming beams in arbitrary directions.

In the above description, the components of the transmission control apparatus 100 may be realized by hardware or may be realized by software. Furthermore, each component may be realized by a combination of software and hardware. A computer may be made to function as the transmission control apparatus 100 by executing a program. The program may be installed on the computer functioning as at least a portion of the transmission control apparatus 100, from a storage apparatus connected to a network or from a computer readable medium.

The program that is installed on the computer and causes the computer to function as the transmission control apparatus 100 according to the present embodiment affects the CPU and the like to cause the computer to function as each component of the transmission control apparatus 100. The information processes recorded in these programs are read by the computer to function as a specific means realized by the cooperation of software and hardware resources of the transmission control apparatus 100.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: first antenna, 20: second antenna, 30: third antenna, 40: fourth antenna, 50: fifth antenna, 60: sixth antenna, 70: seventh antenna, 80: eighth antenna, 90: polarization plane, 91: polarization plane, 100: transmission control apparatus, 101: test signal transmitting section, 102: feedback signal receiving section, 104: beam characteristic determining section, 111: first phase difference determining section, 112: second phase difference determining section, 113: third phase difference determining section, 114: fourth phase difference determining section, 115: fifth phase difference determining section, 116: sixth phase difference determining section, 117: seventh phase difference determining section, 118: eighth phase difference determining section, 120: transmission control section, 130: codebook acquiring section, 140: codebook editing section, 150: codebook, 200: transmission control apparatus

What is claimed is:

1. A transmission control apparatus comprising:
   a first antenna;
   a second antenna that is orthogonal to the first antenna;
   a third antenna arranged parallel to the first antenna;
   a fourth antenna that is orthogonal to the third antenna; and
   a processor configured to
      determine a beam direction of a beam formed by the transmission control apparatus and a polarization characteristic of the beam formed by the transmission control apparatus based on a feedback signal received from a mobile terminal capable of wireless communication with the transmission control apparatus;

determine a first phase difference, for a phase difference between an electric wave output by the first antenna and an electric wave output by the second antenna and for a phase difference between an electric wave output by the third antenna and an electric wave output by the fourth antenna, based on the determined polarization characteristic;

determine a second phase difference, for a phase difference between the electric wave output by the first antenna and the electric wave output by the third antenna and for a phase difference between the electric wave output by the second antenna and the electric wave output by the fourth antenna, based on the determined beam direction; and control phases of the electric waves output by the first antenna, the second antenna, the third antenna, and the fourth antenna according to the first phase difference and the second phase difference, wherein a path between the first antenna and the mobile terminal is the same as a path between the second antenna and the mobile terminal, and a path between the third antenna and the mobile terminal is the same as a path between the fourth antenna and the mobile terminal.

2. The transmission control apparatus according to claim 1, wherein the processor is further configured to determine the first phase difference in a first layer among a plurality of layers in which are respectively transmitted a plurality of beams that differ from each other with respect to at least one of the beam direction and the polarization characteristic, determine the second phase difference in the first layer, determine a third phase difference, which forms a polarization plane orthogonal to a polarization plane formed by the first phase difference, for the phase difference between the electric wave output by the first antenna and the electric wave output by the second antenna and for the phase difference between the electric wave output by the third antenna and the electric wave output by the fourth antenna in a second layer among the plurality of layers;

determine a fourth phase difference, which is the same as the second phase difference, for the phase difference between the electric wave output by the first antenna and the electric wave output by the third antenna and for the phase difference between the electric wave output by the second antenna and the electric wave output by the fourth antenna in the second layer, and control the phases of the electric waves output by the first antenna, the second antenna, the third antenna, and the fourth antenna based on the first phase difference, the second phase difference, the third phase difference, and the fourth phase difference.

3. The transmission control apparatus according to claim 2, wherein in a case where the processor determines that the beam direction is $\theta_0$, the polarization plane of the first layer has vertical polarization, and the polarization plane of the second layer has horizontal polarization, the processor is further configured to:

determine a value of 0 for the phase difference between the electric wave output by the first antenna and the electric wave output by the second antenna and for the phase difference between the electric wave output by the third antenna and the electric wave output by the fourth antenna, determine a value $\delta$ according to Expression 1 for the phase difference between the electric wave output by the first antenna and the electric wave output by the third antenna and for the phase difference between the electric wave output by the second antenna and the electric wave output by the fourth antenna, determine a value of 180 degrees for the phase difference between the electric wave output by the first antenna and the electric wave output by the second antenna and for the phase difference between the electric wave output by the third antenna and the electric wave output by the fourth antenna, and determine the value $\delta$ according to Expression 1 for the phase difference between the electric wave output by the first antenna and the electric wave output by the third antenna and for the phase difference between the electric wave output by the second antenna and the electric wave output by the fourth antenna, and $$d \cdot \sin \theta_0 = \delta \lambda / 2\pi.$$  Expression 1 is defined as:

4. The transmission control apparatus according to claim 2, wherein in a case where the processor determines that the beam direction is $\theta_0$, the polarization plane of the first layer has left-handed circular polarization, and the polarization plane of the second layer has right-handed circular polarization, the processor is further configured to:

set the phase of the first antenna to be −1, sets the phase of the second antenna to be j, and determines a value of 90 degrees for the phase difference between the electric wave output by the first antenna and the electric wave output by the second antenna and for the phase difference between the electric wave output by the third antenna and the electric wave output by the fourth antenna, determine a value $\delta$ according to Expression 1 for the phase difference between the electric wave output by the first antenna and the electric wave output by the third antenna and for the phase difference between the electric wave output by the second antenna and the electric wave output by the fourth antenna, set the phase of the first antenna to j, sets the phase of the second antenna to −1, and determines a value of 90 degrees for the phase difference between the electric wave output by the first antenna and the electric wave output by the second antenna and for the phase difference between the electric wave output by the third antenna and the electric wave output by the fourth antenna, and determine the value $\delta$ according to Expression 1 for the phase difference between the electric wave output by the first antenna and the electric wave output by the third antenna and for the phase difference between the electric wave output by the second antenna and the electric wave output by the fourth antenna, and $$\delta = 2\pi d \cdot \sin \theta_0 / \lambda.$$  Expression 1 is defined as:

5. The transmission control apparatus according to claim 2, wherein the processor is further configured to:

acquire a codebook for precoding in Transmission Mode 4, which is an LTE (Long Term Evolution) transmission mode defined according to 3GPP (3rd Generation Partnership Project);

edit the acquired codebook based on the first phase difference, the second phase difference, the third phase difference, and the fourth phase difference, and control the phases of the electric waves output by the first antenna, the second antenna, the third antenna, and the fourth antenna using the edited codebook.

6. The transmission control apparatus according to claim 1, wherein the first antenna and the second antenna form a cross dipole antenna, and the third antenna and the fourth antenna form a cross dipole antenna.

7. The transmission control apparatus according to claim 1, wherein the transmission control apparatus conforms to Transmission Mode 8, which is an LTE (Long Term Evolution) transmission mode defined according to 3GPP (3rd Generation Partnership Project).

8. A non-transitory computer readable medium storing thereon a program that causes a computer to perform operations comprising:

determining a beam direction of a beam formed by a transmission control apparatus and a polarization characteristic of the beam formed by the transmission control apparatus based on a feedback signal received from a mobile terminal capable of wireless communication with the transmission control apparatus;

determining a first phase difference, for a phase difference between an electric wave output by a first antenna of the transmission control apparatus and an electric wave output by a second antenna of the transmission control apparatus and for a phase difference between an electric wave output by a third antenna of the transmission control apparatus and an electric wave output by a fourth antenna of the transmission control apparatus, based on the determined polarization characteristic, the second antenna being orthogonal to the first antenna, the third antenna being arranged parallel to the first antenna, the fourth antenna being orthogonal to the third antenna, a path between the second antenna and the mobile terminal being the same as a path between the first antenna and the mobile terminal, and a path between the fourth antenna and the mobile terminal being the same as a path between the third antenna and the mobile terminal;

determining a second phase difference, for a phase difference between the electric wave output by the first antenna and the electric wave output by the third antenna and for a phase difference between the electric wave output by the second antenna and the electric wave output by the fourth antenna, based on the determined beam direction; and controlling phases of the electric waves output by the first antenna, the second antenna, the third antenna, and the fourth antenna according to the first phase difference and the second phase difference.

9. The non-transitory computer readable medium according to claim 8, wherein the operations further comprise:

determining the first phase difference in a first layer among a plurality of layers in which are respectively transmitted a plurality of beams that differ from each other with respect to at least one of the beam direction and the polarization characteristic, determining the second phase difference in the first layer, determining a third phase difference, which forms a polarization plane orthogonal to a polarization plane formed by the first phase difference, for the phase difference between the electric wave output by the first antenna and the electric wave output by the second antenna and for the phase difference between the electric wave output by the third antenna and the electric wave output by the fourth antenna in a second layer among the plurality of layers;

determining a fourth phase difference, which is the same as the second phase difference, for the phase difference between the electric wave output by the first antenna and the electric wave output by the third antenna and for the phase difference between the electric wave output by the second antenna and the electric wave output by the fourth antenna in the second layer, and controlling the phases of the electric waves output by the first antenna, the second antenna, the third antenna, and the fourth antenna based on the first phase difference, the second phase difference, the third phase difference, and the fourth phase difference.

10. The non-transitory computer readable medium according to claim 9, wherein in a case where it is determined that the beam direction is $\theta_0$, the polarization plane of the first layer has vertical polarization, and the polarization plane of the second layer has horizontal polarization, the operations further comprise:

determining a value of 0 for the phase difference between the electric wave output by the first antenna and the electric wave output by the second antenna and for the phase difference between the electric wave output by the third antenna and the electric wave output by the fourth antenna, determining a value $\delta$ according to Expression 1 for the phase difference between the electric wave output by the first antenna and the electric wave output by the third antenna and for the phase difference between the electric wave output by the second antenna and the electric wave output by the fourth antenna, determining a value of 180 degrees for the phase difference between the electric wave output by the first antenna and the electric wave output by the second antenna and for the phase difference between the electric wave output by the third antenna and the electric wave output by the fourth antenna, and determining the value $\delta$ according to Expression 1 for the phase difference between the electric wave output by the first antenna and the electric wave output by the third antenna and for the phase difference between the electric wave output by the second antenna and the electric wave output by the fourth antenna, and $$d \cdot \sin \theta_0 = \delta \lambda / 2\pi.$$ Expression 1 is defined as:

11. The non-transitory computer readable medium according to claim 9, wherein in a case where it is determined that the beam direction is $\theta_0$, the polarization plane of the first layer has left-handed circular polarization, and the polarization plane of the second layer has right-handed circular polarization, the operations further comprise:

setting the phase of the first antenna to be −1, sets the phase of the second antenna to be j, and determines a value of 90 degrees for the phase difference between the electric wave output by the first antenna and the electric wave output by the second antenna and for the phase difference between the electric wave output by the third antenna and the electric wave output by the fourth antenna, determining a value $\delta$ according to Expression 1 for the phase difference between the electric wave output by the first antenna and the electric wave output by the third antenna and for the phase difference between the electric wave output by the second antenna and the electric wave output by the fourth antenna, setting the phase of the first antenna to j, sets the phase of the second antenna to −1, and determines a value of 90 degrees for the phase difference between the electric wave output by the first antenna and the electric wave output by the second antenna and for the phase difference between the electric wave output by the third antenna and the electric wave output by the fourth antenna, and determining the value δ according to Expression 1 for the phase difference between the electric wave output by the first antenna and the electric wave output by the third antenna and for the phase difference between the electric wave output by the second antenna and the electric wave output by the fourth antenna, and $$\delta = 2\pi d \cdot \sin\theta_0/\lambda.$$ Expression 1 is defined as:

12. The non-transitory computer readable medium according to claim 9, wherein the operations further comprise:

acquiring a codebook for precoding in Transmission Mode 4, which is an LTE (Long Term Evolution) transmission mode defined according to 3GPP (3rd Generation Partnership Project);

editing the acquired codebook based on the first phase difference, the second phase difference, the third phase difference, and the fourth phase difference, and controlling the phases of the electric waves output by the first antenna, the second antenna, the third antenna, and the fourth antenna using the edited codebook.

13. The non-transitory computer readable medium according to claim 8, wherein the first antenna and the second antenna form a cross dipole antenna, and the third antenna and the fourth antenna form a cross dipole antenna.

14. The non-transitory computer readable medium according to claim 8, wherein the computer conforms to Transmission Mode 8, which is an LTE (Long Term Evolution) transmission mode defined according to 3GPP (3rd Generation Partnership Project).

* * * * *